(12) United States Patent
Gerdhenrichs et al.

(10) Patent No.: US 11,745,987 B2
(45) Date of Patent: Sep. 5, 2023

(54) DETECTION OF LOCKING DEVICES

(71) Applicant: Siemens Aktiengesellschaft, Munich (DE)

(72) Inventors: Ralf Gerdhenrichs, Erlangen (DE); Thomas Dobler, Hatzenbuehl (DE); Alexander Willhoeft, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1005 days.

(21) Appl. No.: 16/333,100

(22) PCT Filed: Aug. 8, 2017

(86) PCT No.: PCT/EP2017/070068
§ 371 (c)(1),
(2) Date: Mar. 13, 2019

(87) PCT Pub. No.: WO2018/050365
PCT Pub. Date: Mar. 22, 2018

(65) Prior Publication Data
US 2019/0367335 A1 Dec. 5, 2019

(30) Foreign Application Priority Data
Sep. 14, 2016 (EP) .................................... 16188778

(51) Int. Cl.
*B66C 13/16* (2006.01)
*B66C 13/48* (2006.01)
(Continued)

(52) U.S. Cl.
CPC .............. *B66C 13/16* (2013.01); *B66C 13/48* (2013.01); *G05B 19/0428* (2013.01); *B66C 19/007* (2013.01); *G05B 2219/24097* (2013.01)

(58) Field of Classification Search
CPC ....... B66C 13/16; B66C 13/48; B66C 19/007; G05B 19/0428; G05B 2219/24097
(Continued)

(56) References Cited

U.S. PATENT DOCUMENTS 6,081,292 A 6/2000 Lanigan, Jr. et al.
2005/0192702 A1* 9/2005 Moutsokapas ....... B65G 63/004
700/213
(Continued)

FOREIGN PATENT DOCUMENTS

CN 101911103 12/2010
DE 102012020953 4/2014
(Continued)

OTHER PUBLICATIONS

Office Action dated Nov. 4, 2020 issued in Chinese Patent Application No. 201780049677.6.
(Continued)

*Primary Examiner* — Gabriel I Garcia
(74) *Attorney, Agent, or Firm* — Cozen O'Connor

(57) ABSTRACT

An image-processing unit, a system, an automatic loading and/or unloading system and a method for detecting a locking device on a movable object, wherein the locking device locks a plurality of movable objects to one other and is arranged in a locking region of the movable object and the movable object is moved via a loading device, where the locking region can be sensed in a sensing region of at least one camera and an image-processing unit evaluates a signal of the camera to detect locking devices in a locking region of a movable object so as to detect locking devices efficiently and reliably.

19 Claims, 3 Drawing Sheets

(51) Int. Cl.
*G05B 19/042* (2006.01)
*B66C 19/00* (2006.01)

(58) Field of Classification Search
USPC .......................................... 382/103
See application file for complete search history.

(56) References Cited

U.S. PATENT DOCUMENTS

| | | | | |
|---|---|---|---|---|
| 2008/0252417 | A1* | 10/2008 | Thomas | G06Q 10/08 340/10.1 |
| 2009/0095866 | A1* | 4/2009 | Brescia | B60P 7/13 410/77 |
| 2011/0175727 | A1 | 7/2011 | Aikaterinidis | |
| 2016/0031688 | A1* | 2/2016 | Versteyhe | B66F 9/20 701/50 |

FOREIGN PATENT DOCUMENTS

| | | | |
|---|---|---|---|
| EP | 3296247 A1 * | 3/2018 | ............ B66C 13/16 |
| JP | 2003-054871 | 2/2003 | |
| WO | WO2014/169096 | 10/2014 | |

OTHER PUBLICATIONS

OrlacoProducts: "View on Barge Handling"; Orlaco Specialised Camera Solutions; XP-002765218; gefunden im Internet, URL:https://www.youtube.com/watch?v=sV01k5wcoOk, gefunden am Dec. 14, 2016; 2012.

PCT International Search Report and Written Opinion of International Searching Authority dated Jan. 12, 2017 corresponding to PCT International Application No. PCT/EP2017/070068 filed Aug. 8, 2017.

* cited by examiner

DETECTION OF LOCKING DEVICES

CROSS-REFERENCE TO RELATED APPLICATIONS

This is a U.S. national stage of application No. PCT/EP2017/070068 filed Aug. 8, 2017. Priority is claimed on EP Application No. 16188778 filed Sep. 14, 2016, the content of which is incorporated herein by reference in its entirety.

BACKGROUND OF THE INVENTION

1. Field of the Invention

The invention relates to a method for detecting locking devices on a movable object, an image processing unit, a system for performing the method, and to an automatic loading and/or unloading system.

2. Description of the Related Art

Method are used in a crane system for the loading of containers, for example. If in this context a container locking mechanism is mistakenly forgotten on the container, it is not readily possible to continue loading the container. Transport vehicles or containers can become caught up as a consequence. In some circumstances, this can lead to significant damage to the crane mechanism, vehicles and containers, and even personal injury. If a container with a forgotten locking mechanism is put down, then the container will stand on the locking mechanism and this results in a tilted position of the container. Until now, it has been the responsibility of the crane driver to identify such forgotten locking mechanisms. In order to relieve the crane driver and to allow complete automation of such systems, a method for detecting locking devices is proposed in the following.

DE 10 2012 020 953 A1 discloses a method for computer-aided specification of the position at which an ISO container must be set down on a carrier vehicle by a crane, with reference to a cloud of measurement points representing the top side of the carrier vehicle, where measurement points are obtained by scanning the carrier vehicle from above using a 3D laser scanner. Here, the cloud of measurement points is sampled using at least one virtual test piece, this having at least partly a shape that approximates the shape of that twistlock part on the carrier vehicle that projects over the top side of the carrier vehicle. In addition, all locations are determined at which the shape of the virtual test piece approximating a twistlock corresponds, at least to a predetermined degree, to the local shape of the cloud of measurement points, and destination position data for the container that must be set down on the carrier vehicle is calculated from the twistlock locations determined thus.

WO 2014/169096 discloses a method for selecting a trajectory in which, for this purpose, use is made of a twistlock sensor that is designed to identify the locations of twistlock holes.

SUMMARY OF THE INVENTION

It is an object of the invention is to provide a method that allows locking devices to be identified efficiently and reliably.

This and other objects and advantages are achieved in accordance with the invention by a method, wherein the locking device is configured to lock a plurality of movable objects to one another and/or to lock on an object carrier, where the locking device is configured to be arranged in a locking region of the movable object, where the movable object is configured to be moved via a loading device, where the locking region can be sensed in a sensing region of at least one camera, and where an image processing unit evaluates a signal of the camera to detect locking devices in a locking region of the movable object.

A locking device is understood to mean both an individual locking device and a plurality of locking devices. Reference is therefore made in the following to detection of locking devices or detection of a locking device, thereby indicating all possible detection results. Possible detection results are, for example: "no locking device was identified", "a locking device was identified" or "several locking devices were identified". Therefore if the method is performed to detect only one locking device or no locking devices, this is equally in accordance with the invention as the detection of a plurality of locking devices. In this case, the locking devices are configured to lock a plurality of movable objects, e.g., freight containers, to one another and/or to lock on or onto an object carrier, and to be arranged in a locking region of the movable object. The movable object is configured to be moved via a loading device and the locking region can be sensed in a sensing region of at least one camera. In order to detect a locking device on a movable object, in particularly "twistlocks" on freight containers, an image processing unit evaluates a signal of the camera to detect locking devices in a locking region of a movable object. An object carrier, in this case can be, for example, a trailer of a lorry (truck) or other carrier that is structured to receive or lock onto a movable object.

The locking region of the movable object is essentially the region in which locking devices are attached. In the case of containers, this region comprises, e.g., the outer corners to which the twistlocks are attached. Depending on the size of the containers and depending on the layout of the site, one or more cameras are oriented such that the movable objects move through the sensing region of the cameras during transport by the loading device, and such that the locking region is situated at least partly and at least briefly in the sensing region for the purpose of detecting locking devices.

The sensing region is largely dependent on the orientation, the resolution and the optics of the camera. The sensing region must therefore be selected accordingly. For example, at least one camera can be provided per crane side.

In a particularly advantageous embodiment, the image processing unit outputs an error message if a locking device has been identified. This error message can then be forwarded via a Programmable Logic Controller (PLC) to the crane driver, for example, who then initiates appropriate further steps. The PLC can also react to such an error message independently. For greater certainty, it is equally feasible for the image processing unit to output a so-called "active high", i.e., a permanently active logic level. For this purpose, failure to identify a locking device is signaled continuously. If a locking device is identified, the "active high" drops out and an error message can be output.

In a further embodiment, the image processing unit evaluates the signal of the camera or the cameras to check the correct position of the movable object. This makes it possible to identify whether the movable object is situated in a position that is suitable for detecting a locking device. The position data can be learned in this case, e.g., with reference to acquired standardized sizes of moved objects. It is equally feasible for the corresponding dimensions to be stored in a central logistics system for each currently moved object, and provided to the image processing unit for checking the correct position of the movable object. Particularly, in the case of containers, standard dimensions can be acquired or stored in the image processing unit. It is also feasible to store these standard dimensions in other storage locations that can be accessed by the image processing unit.

In a particularly advantageous embodiment, the image processing unit evaluates the signal of the camera via blob analysis. Here, the blob analysis is a way of sensing objects as "blobs" and distinguishing these from the background in the image. It is moreover particularly advantageous for the blob analysis to occur across the entire grayscale range in order to allow for different light influences such as sun, shadow, rain, or artificial lighting. With the blob analysis, e.g., the positioning and the size of the moved object can be determined and compared with a reference position/size in this case.

Furthermore, it is particularly advantageous for the image processing unit to evaluate the signal of the camera via a difference image evaluation. For example, if a definitive position has been determined, the evaluation of the image region below the lower container corners, in which e.g., a twistlock may be situated, can be performed via a difference image evaluation. The locking regions, which are now situated in the sensing region of the camera or cameras, are therefore examined for the presence of a locking device via a difference image evaluation. A difference image evaluation in this case requires a movement of the container (min. pixels per movement). It is particularly advantageous in this case that if the blob analysis and the difference image evaluation are combined, the system can automatically identify a positional change or a movement via an X/Y evaluation of the blob analysis, and can therefore react immediately to travel halts during loading, without causing false alarms.

In a further advantageous embodiment, a controller interrupts a loading and/or unloading process if a locking device is identified. The controller in this case can be a central controller, e.g., in the form of a Programmable Logic Controller (PLC), that controls the entire loading and/or unloading process. It is, however, equally feasible for the controller merely to output a corresponding signal to the crane driver, who must then confirm the signal. The loading and/or unloading process can then be continued when the mistakenly attached locking device has been removed or the movable object, e.g., the container, has been transported to a location for removal of the locking device.

In a further advantageous embodiment, the image processing unit only evaluates a signal from the camera if the movable object is located in the sensing region. It is not then necessary to continuously evaluate the signals from the cameras, i.e., the image or images from the cameras. This reduces unnecessary traffic over the network of the control system. If it is then identified that, for example, a movable object moves into a sensing region of the camera, the detection can be performed. Here, the information indicating whether a movable object is situated in the sensing region can be provided by a central controller which monitors the position, for example, and used for the purpose of triggering or plausibility checking.

In a further embodiment, the classification data of the current movable object is provided to the image processing unit for the purpose of detecting locking devices. The classification data may comprise the type and shape of the movable object in this case. For example, the external dimensions of the container, possibly even the colors and potential locations of locking devices, may be included in this case. The image processing unit can then perform the identification of forgotten locking devices even more efficiently with reference to the classification data. The classification data can be provided by a controller, a central logistics system or databases via a communication system.

In a further embodiment, detected locking devices are removed automatically. For this purpose, it is feasible for the movable object to be transported to a further location, where locking devices can be removed via a machine, either automatically or manually. It is equally feasible for a small robot, e.g., in the form of one or more robot arms, or further solutions to remove the locking devices directly in the identification region. This would have the advantage that confirmation of the removal of the locking devices could be performed directly by the method itself. Here, it is feasible for the removal to be so quick that the loading process does not have to be interrupted, and alternatively equally possible for the loading process to be interrupted at least briefly to allow safe removal of the locking devices.

In a particularly advantageous embodiment, the removal of detected locking devices is documented in a central logistics system. The central logistics system has information about the origin and the final whereabouts of the movable objects. If the movable object is now assigned to a different location due to the removal of a locking device, then the central logistics system can react to this directly and complete delivery documentation can be guaranteed.

In a further embodiment, the image processing unit determines an identification code of the movable object. Here, the identification code can be, e.g., a container number of a container, as defined in ISO 6346. It is thereby possible either to verify existing data from a central logistics system and update said data in case of doubt, or to directly assign the unloaded goods to central logistics data.

It is also an object of the invention to provide an image processing unit for performing the method in accordance with the invention. To this end, the image processing unit has at least one signal interface, a communications interface and an evaluation unit, where the signal interface is configured to connect to at least one camera, where the communications interface is configured to communicate with at least one controller, and where the evaluation unit is configured to evaluate a signal of the at least one camera to detect a locking device. Such an image processing unit can be formed as a standalone unit, as part of a PLC or even cloud-based. Here, the interfaces can be standard Ethernet, industry-standard interfaces or other specific interfaces.

It is also an object of the invention to provide a system for detecting locking devices on a movable object, where the system comprises at least one image processing unit and at least one camera. Here, the cameras are oriented such that the locking region of a movable object can be sensed in a sensing region of at least one camera during movement by a loading device.

In an advantageous embodiment of the system, the at least one camera is oriented such that solar radiation is avoided during operation by virtue of the orientation. For example, the camera can be oriented in that direction of the sky from which no solar radiation is expected during operation. Automatic cleaning systems for cleaning the camera optics to reduce optical interference are also feasible.

In an advantageous embodiment of the system, the at least one camera is oriented downwards at an inclination angle, in particular an inclination angle of 20 to 30 degrees downwards. This is particularly advantageous as both the solar radiation and other meteorological influences can be minimized thereby.

It is also an object of the invention to provide an automatic loading and/or unloading system that comprises at least a system for performing the method in accordance with the invention, a loading device for moving a movable object, and a controller for controlling a loading and/or unloading process. Such integration is particularly advantageous, as it is thereby possible to effect a seamless integration into the logistics flow of existing sites. The error probability of such a site is correspondingly reduced and the availability can be increased.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described and explained in greater detail below with reference to the exemplary embodiments illustrated in the figures, in which.

DETAILED DESCRIPTION OF THE EXEMPLARY EMBODIMENTS

Figure 1:
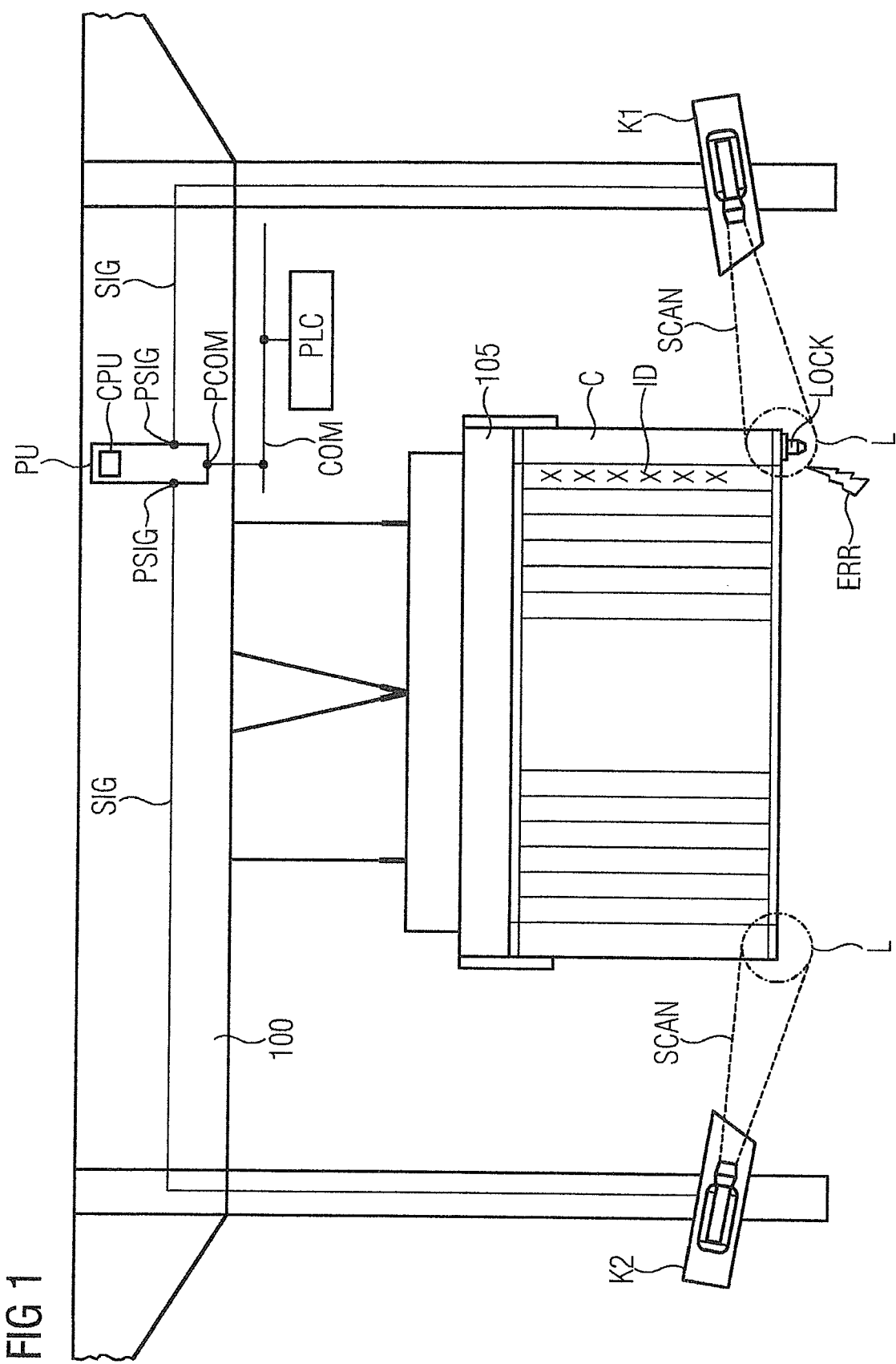
FIG. 1 shows a loading device in the form of a container crane with a system for detecting locking devices.

FIG. 1 shows a loading device 100 in the form of a container crane which is configured to load movable objects C, in the form of containers in this case. In order to achieve this, the loading device 100 has a hoist 105, also known as a spreader. A controller PLC is provided for the purpose of controlling the loading device 100. The controller PLC has a communication connection COM to a communication interface PCOM of an image processing unit PU. The image processing unit PU further comprises two signal interfaces PSIG and an evaluation unit CPU. Here, the communication connection COM can preferably be formed as an IP-based connection, but further protocols are equally feasible. The signal interfaces PSIG are configured to receive a signal SIG from cameras K1, K2. The cameras K1, K2 each have a sensing region SCAN, which can be adjusted via their orientation. Here, the cameras K1 and K2 are oriented at a slight inclination downwards, such that they can reliably detect locking devices LOCK on the underside of the movable objects C. In this case, locking regions L of the movable object C are situated in the sensing region SCAN, where a locking device LOCK is situated in the right-hand locking region L and no locking device is present in the left-hand locking region L. The arrow ERR in the shape of a lightning bolt indicates that the presence of the locking device LOCK in the right-hand locking region L represents an error ERR. If the illustrated movable object C, i.e., the container, now continues to be loaded in this manner, a tilted position of the container or in the worst case even partial locking onto a further container would occur, possibly resulting in personal injury.

In the illustrated state, the movable object C with its locking regions L is situated in the sensing region SCAN. In order to achieve coverage of the sensing regions SCAN of the cameras K1, K2 reliably, including the locking regions L, for the purpose of sensing locking devices LOCK, data can be used for positioning by the PLC, the data coming from a central logistics system, for example, and containing the dimensions of a moved object C. It is equally feasible for the image processing unit PU to automatically identify a movement of a locking region L through the sensing region SCAN.

For the purpose of detecting twistlocks, both lower corners (twistlock threaded holes) ideally lie in the sensing region SCAN of the cameras K1, K2. The cameras K1, K2 can be installed in a weather-protective housing with a sun canopy at a downward angle of approximately 25°, for example, in order to minimize any impairment to the image identification due to sun and rain, even over an extended time period. The image information, i.e., the signal SIG of the cameras K1, K2, is supplied to the image processing unit PU via the communication connection. In this case, the image processing unit PU is installed on, e.g., the crane and can read in the signal SIG of the cameras K1, K2, e.g., the images, in digital or analog format, before processing the signal SIG and forwarding the detection results to the controller PLC.

The detection reliability for identifying a locking device that has not been removed is dependent on the quality of the signals SIG supplied by the cameras K1, K2. Provision must therefore be made for a maintenance interval in which the cameras K1, K2 are cleaned. Using additional resources, such as a screen wiper system and spray water tank, the maintenance can also be activated by the controller PLC.

Figure 2:
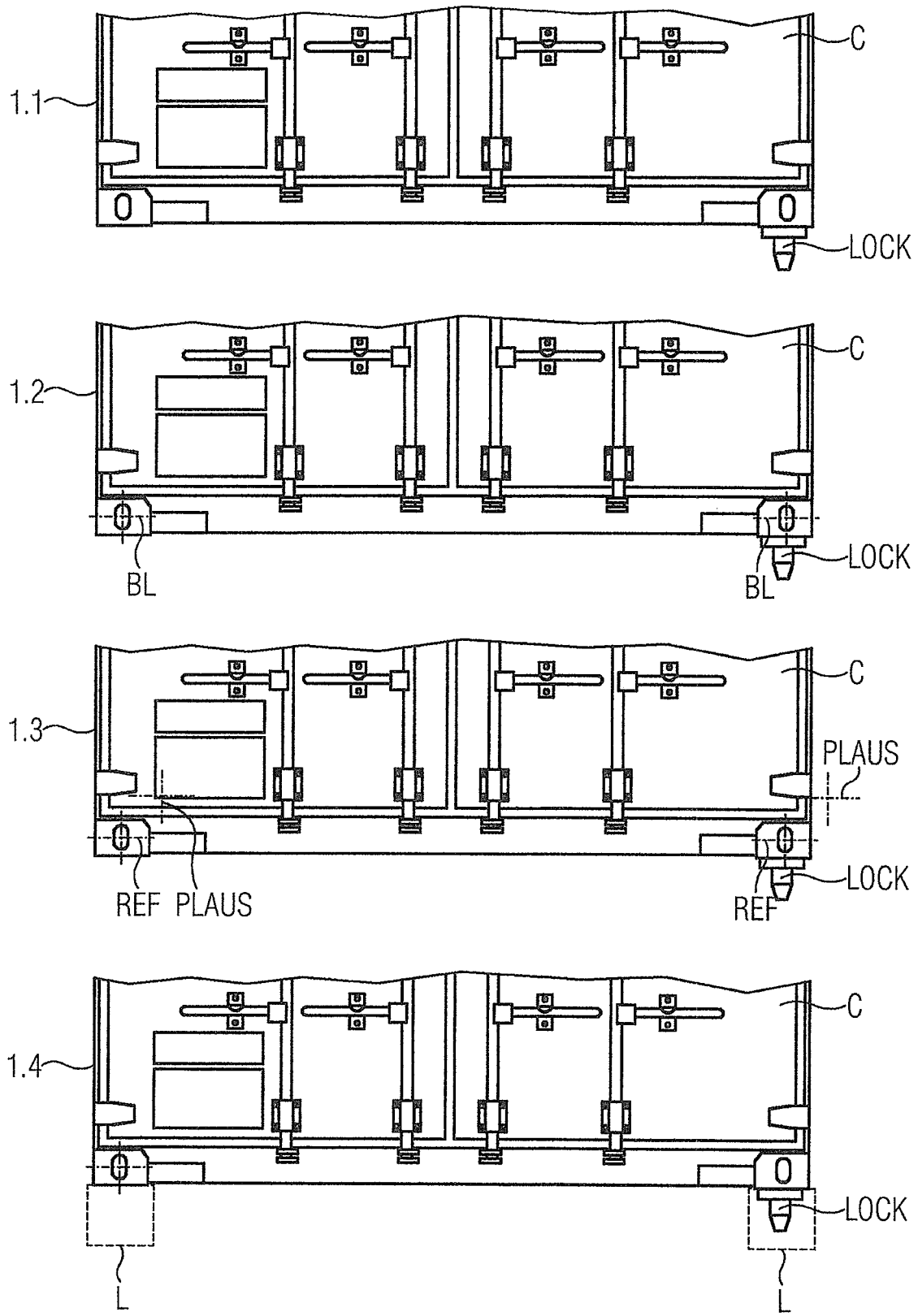
FIG. 2 shows an example of the detection of a locking device.

FIG. 2 schematically shows a possible detection procedure for locking devices. For this purpose, movable objects C are divided into the steps 1.1 to 1.4. The sequence is not obligatory in this case. The reference signs of the elements from FIG. 1 are used here again.

In step 1.1, a movable object C is shown with a locking device LOCK that has apparently not been correctly removed. The movable object C is now loaded by a loading device 100 which, for the sake of clarity, is not shown.

In step 1.2, a blob analysis has been performed in this case in order to measure or to determine the position of the movable object C. In this case, the markers BL set by the blob analysis can mark, e.g., the corners of a movable object C at which a locking device LOCK is generally expected.

In order to avoid any unnecessary load on the communication connection COM, the detection should not operate continuously. The definitive triggering can be derived from the known coordinates of the loading device 100 or its hoist 105. Using this procedure, it is ensured that the movable object C, i.e., the container, is situated at least partially in the sensing region SCAN of the cameras K1, K2. The detection occurs during the entire operation and is terminated again when a specific position of the movable object 100 is reached.

In step 1.3, a plausibility check is performed using acquired reference positions REF. This involves the use of, e.g., constants and/or known widths of movable objects C, such as standardized container widths, illustrated here as reference positions REF. Also shown is a plausibility position PLAUS, which can be used to indicate a permissible divergence from the reference position REF, for example. Such a permissible divergence could be realized, for example, via a correspondingly large sensing region SCAN of the cameras K1, K2. The detection is already based on a blob analysis for measuring or determining the position of a movable object C as performed in step 1.2. The blob analysis can occur across the entire grayscale range, in order to allow for different light influences due to sun, shadow, rain or lighting sources. In step 1.3, the position that has been determined is verified with reference to the plausibility positions PLAUS and reference positions REF.

In step 1.4, locking regions L are now determined and evaluated via a difference image evaluation. The left-hand locking region L does not contain a locking device in this case, while the right-hand locking region L does mistakenly contain a locking device LOCK in this case. If the definitive position was determined in accordance with previous steps 1.1 to 1.3, the evaluation of the image region below the lower container corners, in which a twistlock may be situated, can be performed via the difference image processing. A difference image evaluation requires a movement of the container (min. pixels per movement). The system automatically identifies a positional change/movement via an X/Y evaluation of the blob analysis and can therefore react to travel halts during loading, without causing false alarms.

The detection results of the individual detection steps undergo a plurality of plausibility checks in relation to definitively acquired reference information such as clearance (relates in each case to a constant width and/or length of a movable object C, e.g. a container) and, e.g., the positional height, which is only allowed to vary within a minimum range. The acquisition can occur once as part of the commissioning of the system. It is feasible for the system to be regularly calibrated via a reference object. Using additional information from the crane automation, such as container type 20"/40"/45" or height normal/high/cube, it is possible to enter different detection projects to minimize interference effects. By virtue of the plausibility checks, it is possible to discard incorrectly identified positions caused by dirt or meteorological influences, and thereby increase the stability of the evaluation.

In summary, the invention relates to a method for detecting locking devices LOCK on a movable object C, where the locking devices LOCK are configured to lock a plurality of movable objects C to one another and to be arranged in a locking region L of the movable object C, and where the movable object C is configured to be moved via a loading device 100. The invention further relates to an image processing unit PU, to a system for performing the method in accordance with the invention, and to an automatic loading and/or unloading system. In order to identify locking devices LOCK efficiently and reliably, in accordance with the invention, the locking region L can be sensed in a sensing region SCAN of at least one camera K1, K2, and an image processing unit PU evaluates a signal SIG of the camera K1, K2 in order to detect locking devices LOCK in a locking region L of a movable object C.

Figure 3:
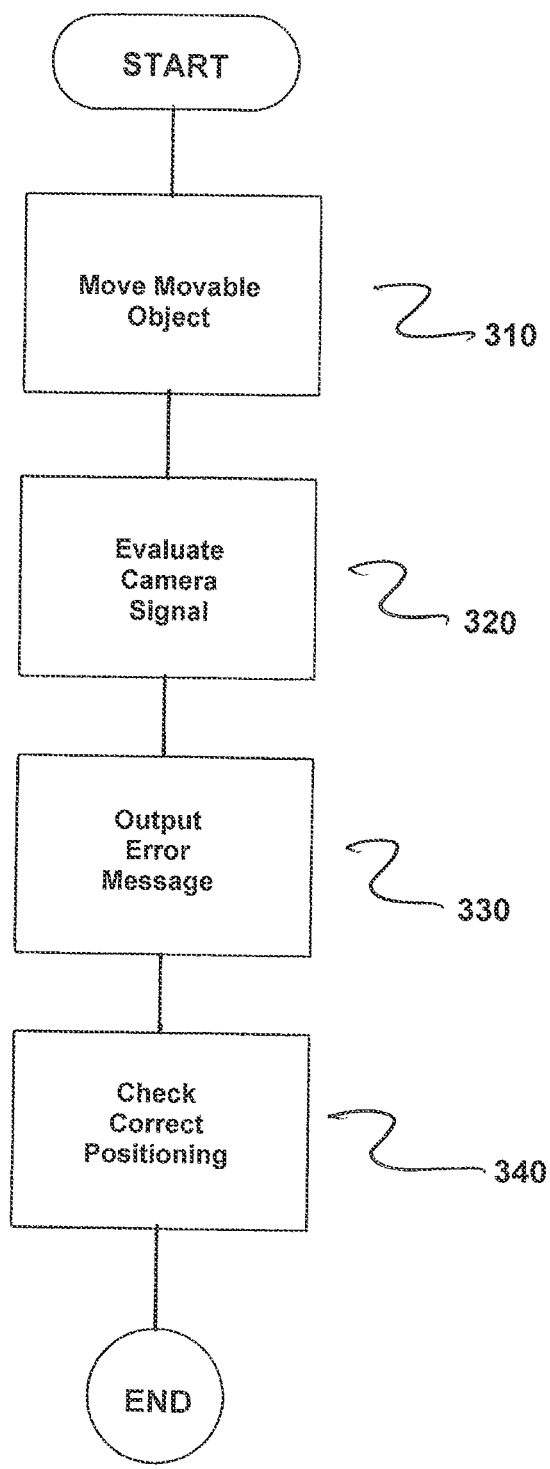
FIG. 3 is a flowchart of the method in accordance with the invention.

FIG. 3 is a flowchart of the method for detecting a locking device LOCK on a movable object C, where the locking device LOCK locks a plurality of movable objects C to one another and/or locks on an object carrier, and where the locking device LOCK is arranged in a locking region L of the movable object C.

The method comprises moving the movable object C via a loading device 100, as indicated in step 310. In accordance with the invention, the locking region L is sensed in a sensing region SCAN of at least one camera K1, K2.

Next, an image processing unit PU evaluates a signal SIG of a camera K1, K2 to detect locking devices LOCK in a locking region L of the movable object C, as indicated in step 320.

Next, the image processing unit PU outputs an error message ERR if the locking device LOCK is identified, as indicated in step 330.

Next, the image processing unit PU, evaluates the signal SIG of the camera K1, K2 to check correct positioning POS of the movable object C, as indicated in step 340.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for detecting a locking device on a movable object, the locking device at least one of (i) locking a plurality of movable objects to one another and (ii) locking on an object carrier, and the locking device being arranged in a locking region of the movable object, the method comprising:
   moving the movable object via a loading device, the locking region being sensed in a sensing region of at least one camera;
   evaluating, by an image processing unit, a signal of a camera to detect locking devices in a locking region of the movable object;
   outputting, by the image processing unit, an error message if presence of the locking device is identified based on failure to remove the locking device from the movable object; and
   evaluating, by the image processing unit, the signal of the camera to check correct positioning of the movable object.

2. The method as claimed in claim 1, wherein the image processing unit evaluates the signal of the camera via a blob analysis.

3. The method as claimed in claim 1, wherein the image processing unit evaluates the signal of the camera via a difference image evaluation.

4. The method as claimed in claim 1, wherein a controller interrupts at least one of (i) a loading process and (ii) unloading process if presence of the locking device is identified.

5. The method as claimed in claim 1, wherein the image processing unit only evaluates a signal from the at least one camera if the movable object is disposed in at least one sensing region.

6. The method as claimed in claim 1, further comprising:
   providing classification data of the current movable object to the image processing unit.

7. The method as claimed in claim 1, wherein detected locking devices are automatically removed from the movable object.

8. The method as claimed in claim 7, wherein the removal of detected locking devices from movable objects is documented in a central logistics system.

9. The method as claimed in claim 1, wherein the image processing unit determines an identification code of the movable object.

10. An image processing unit, comprising:
  at least one signal interface for connection to at least one camera;
  a communications interface for communication with at least one controller; and
  an evaluation unit for evaluating a signal of the at least one camera to detect a locking device;
  wherein the image processing unit is configured to:
    evaluate a signal of the at least one camera to detect locking devices in a locking region of a movable object;
    output an error message if presence of the locking device is identified based on failure to remove the locking device from the movable object; and
    evaluate the signal of the at least one camera to check correct positioning of the movable object.

11. A system for detecting locking devices on a movable object, having at least one image processing unit as claimed in claim 10 and the at least one camera.

12. The system as claimed in claim 11, wherein the at least one camera is oriented such that solar radiation is avoided during operation by virtue of said orientation.

13. The system as claimed in claim 12, wherein the at least one camera is oriented downwards at an inclination angle.

14. The system as claimed in claim 13, wherein the at least one camera is oriented downwards at an inclination angle is oriented downwards at an inclination angle of 20 to 30 degrees downwards.

15. An automatic loading/unloading system having the at least the system as claimed in claim 12, a loading device for moving a movable object, and a controller for controlling a loading/unloading process.

16. The system as claimed in claim 11, wherein the at least one camera is oriented downwards at an inclination angle.

17. The system as claimed in claim 16, wherein the at least one camera is oriented downwards at an inclination angle is oriented downwards at an inclination angle of 20 to 30 degrees downwards.

18. An automatic loading/unloading system having the at least the system as claimed in claim 16, a loading device for moving a movable object, and a controller for controlling a loading/unloading process.

19. An automatic loading/unloading system having the at least the system as claimed in claim 11, a loading device for moving a movable object, and a controller for controlling a loading/unloading process.

* * * * *